US012620664B2

(12) United States Patent
Aditjandra et al.

(10) Patent No.: US 12,620,664 B2
(45) Date of Patent: May 5, 2026

(54) BATTERY TERMINAL FORCE REDUCTION FEATURE FOR BATTERY OPERATED CORDLESS APPLIANCE

(71) Applicant: WHIRLPOOL CORPORATION, Benton Harbor, MI (US)

(72) Inventors: Antonius K. Aditjandra, St. Joseph, MI (US); Richard D. Arnold, St. Joseph, MI (US); Lynsey A. Howse, St. Joseph, MI (US); Rebecca K. Kasner, St. Joseph, MI (US); John J. Myers, Saugatuck, MI (US); Nicholas H. Schutte, St. Joseph, MI (US); Yifan Wang, St. Joseph, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 811 days.

(21) Appl. No.: 17/982,622

(22) Filed: Nov. 8, 2022

(65) Prior Publication Data

US 2023/0155237 A1     May 18, 2023

Related U.S. Application Data

(60) Provisional application No. 63/279,401, filed on Nov. 15, 2021.

(51) Int. Cl.
*H01M 50/262* (2021.01)
*H01M 50/247* (2021.01)

(52) U.S. Cl.
CPC ....... *H01M 50/262* (2021.01); *H01M 50/247* (2021.01)

(58) Field of Classification Search
None
See application file for complete search history.

(56) References Cited

U.S. PATENT DOCUMENTS

| | | |
|---|---|---|
| 3,917,372 A | 11/1975 | Selinko |
| 5,220,520 A | 6/1993 | Kessoku |
| 5,305,180 A | 4/1994 | Mitchell et al. |
| 5,663,011 A | 9/1997 | Bunyea et al. |
| 6,102,720 A | 8/2000 | Tung |
| 6,319,028 B1 | 11/2001 | Zhang et al. |
| 6,419,509 B2 | 7/2002 | Cho |

(Continued)

FOREIGN PATENT DOCUMENTS

| | | |
|---|---|---|
| EP | 1289032 A1 | 3/2003 |
| WO | 9605623 | 2/1996 |

*Primary Examiner* — Maria Laios
(74) *Attorney, Agent, or Firm* — Price Heneveld LLP

(57) ABSTRACT

An appliance includes a housing that has an operable portion. A power receptacle is in electrical communication with the operable portion and has a high-friction interface. A power source selectively engages with the power receptacle to define an installed position that selectively delivers an electrical current from the power source to a motor of the operable portion. At least one resilient member exerts a biasing force against the power source when the power source is in the installed position. The high-friction interface maintains the power source in the installed position during operation of the motor and resists vibration from the operable portion to maintain the power source in the installed position, and at least one of the power receptacle and the power source include the at least one resilient member.

20 Claims, 4 Drawing Sheets

(56) References Cited

U.S. PATENT DOCUMENTS

| | | | |
|---|---|---|---|
| 6,729,413 | B2 | 5/2004 | Turner et al. |
| 6,814,597 | B1 | 11/2004 | Kao |
| 7,661,486 | B2 | 2/2010 | Turner et al. |
| 8,181,717 | B2 | 5/2012 | Turner et al. |
| 8,312,937 | B2 | 11/2012 | Turner et al. |
| 8,573,324 | B2 | 11/2013 | Turner et al. |
| 9,306,198 | B2 | 4/2016 | Turner et al. |
| 9,700,144 | B2 | 7/2017 | Arceci et al. |
| 10,230,080 | B2 | 3/2019 | Turner et al. |
| 11,179,841 | B2 | 11/2021 | Radovich et al. |
| 2003/0039880 | A1* | 2/2003 | Turner ................ H01M 50/247 |
| | | | 429/97 |
| 2009/0255084 | A1 | 10/2009 | Gee, II et al. |
| 2014/0045367 | A1 | 2/2014 | Christie et al. |
| 2018/0169851 | A1 | 6/2018 | Radovich et al. |

* cited by examiner

BATTERY TERMINAL FORCE REDUCTION FEATURE FOR BATTERY OPERATED CORDLESS APPLIANCE

CROSS-REFERENCE TO RELATED APPLICATION

This application claims priority to and the benefit under 35 U.S.C. § 119(e) of U.S. Provisional Patent Application No. 63/279,401, filed on Nov. 15, 2021, entitled "BATTERY TERMINAL FORCE REDUCTION FEATURE FOR BAT-TERY OPERATED CORDLESS APPLIANCE," the entire disclosure of which is hereby incorporated herein by reference.

BACKGROUND OF THE DISCLOSURE

The present disclosure generally relates to battery-oper-ated appliances, and more specifically, to a battery-operated appliance, typically kitchen appliances, having a force-reduction feature that assists in the removal of the battery from a power receptacle that receives the battery.

SUMMARY OF THE DISCLOSURE

According to one aspect of the present disclosure, an appliance includes a housing that has an operable portion. A power receptacle is in electrical communication with the operable portion and has a high-friction interface. A power source selectively engages with the power receptacle to define an installed position that selectively delivers an electrical current from the power source to a motor of the operable portion. At least one resilient member exerts a biasing force against the power source when the power source is in the installed position. The high-friction interface maintains the power source in the installed position during operation of the motor and resists vibration from the oper-able portion to maintain the power source in the installed position, and at least one of the power receptacle and the power source include the at least one resilient member.

According to another aspect of the present disclosure, an appliance includes a housing that has an operable portion. A power receptacle is in electrical communication with the operable portion and has a high-friction interface. A power source selectively engages with the power receptacle and the high-friction interface to define an installed position that selectively delivers an electrical current from the power source to a motor of the operable portion. A lever is attached to the power source, and selectively engages a bearing surface of the housing in the installed position. The high-friction interface maintains the power source in the installed position during operation of the motor and resists vibrations from the operable portion to maintain the power source in the installed position. The lever selectively operates to remove the power source from the installed position. A handle portion rotationally operates to exert a biasing force against the bearing surface that overcomes the high-friction interface and biases the power source away from the installed position.

According to yet another aspect of the present disclosure, an appliance includes a housing that has an operable portion. A power receptacle is in electrical communication with the operable portion and has a high-friction interface. A power source selectively engages with the power receptacle to define an installed position that selectively delivers an electrical current from the power source to the operable portion. A resilient member exerts a biasing force against the power source when the power source is in the installed position. A lever is coupled to the power source. The lever is selectively operable to cooperate with the resilient mem-ber to increase the biasing force that selectively overcomes the high-friction interface. The high-friction interface main-tains the power source in the installed position during operation of a motor of the operable portion and resists vibrations from the operable portion to maintain the power source in the installed position, and at least one of the power receptacle and the power source includes the at least one resilient member.

These and other features, advantages, and objects of the present disclosure will be further understood and appreci-ated by those skilled in the art by reference to the following specification, claims, and appended drawings.

The components in the figures are not necessarily to scale, emphasis instead being placed upon illustrating the prin-ciples described herein.

DETAILED DESCRIPTION

The present illustrated embodiments reside primarily in combinations of method steps and apparatus components related to combinations of methods, steps and apparatus components related to a cordless and battery-operated appli-ance that includes a force reduction feature to maintain a battery in an installed position in response to vibrations experienced by the battery during operation of the appliance, and also to assist in the extraction of the battery from a power receptacle for the appliance. Accordingly, the appa-ratus components and method steps have been represented, where appropriate, by conventional symbols in the draw-ings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

Figure 1:
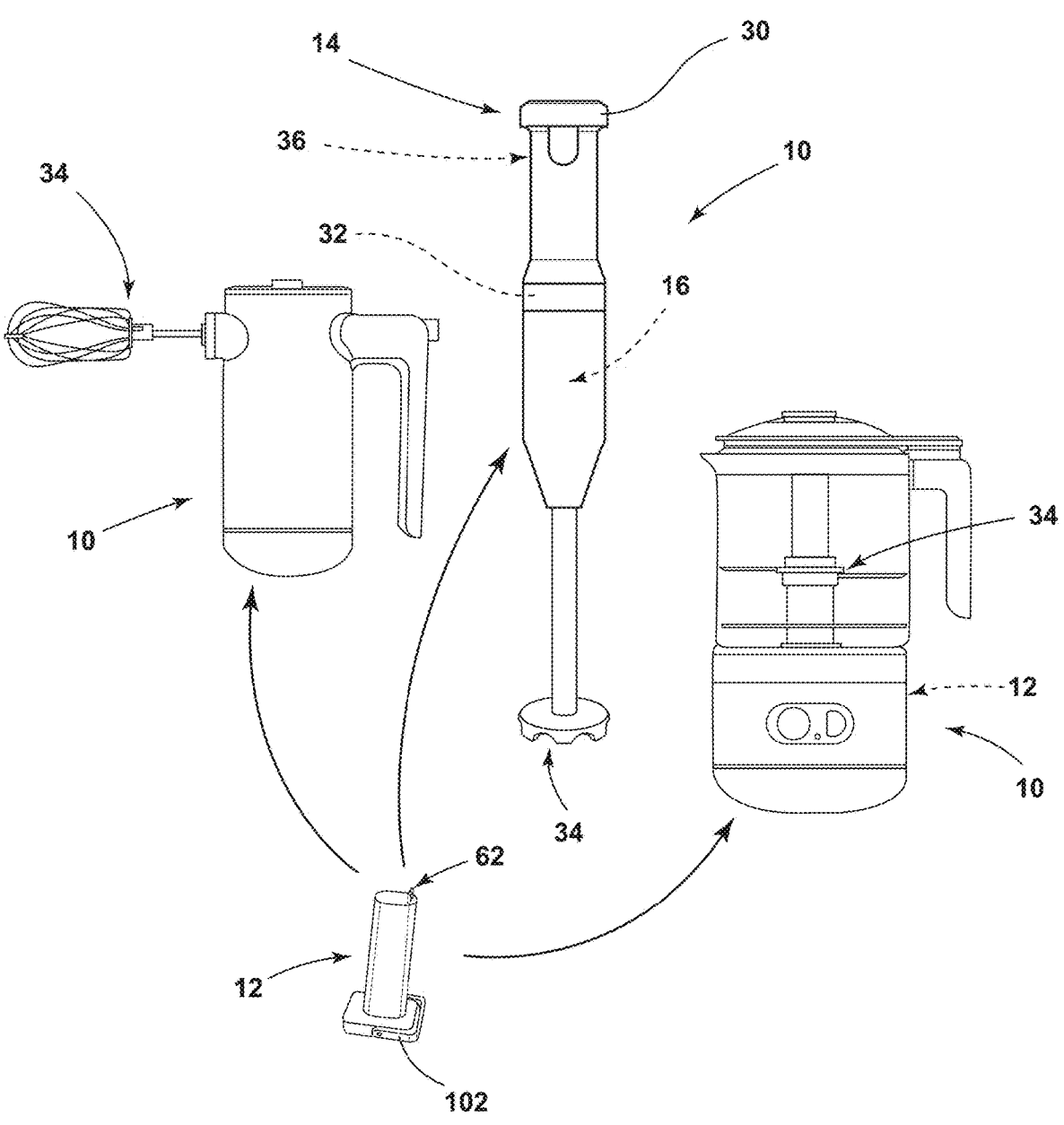
FIG. 1 is a side perspective view of various battery-operated kitchen appliances that utilize an aspect of the force reduction feature.

For purposes of description herein, the terms "upper," "lower," "right," "left," "rear," "front," "vertical," "horizon-tal," and derivatives thereof shall relate to the disclosure as oriented in FIG. 1. Unless stated otherwise, the term "front" shall refer to the surface of the element closer to an intended viewer, and the term "rear" shall refer to the surface of the element further from the intended viewer. However, it is to be understood that the disclosure may assume various alter-native orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises a . . . " does not, without more constraints, preclude the existence of additional identical elements in the process, method, article, or apparatus that comprises the element.

Referring to FIGS. 1-4, reference numeral 10 generally refers to a cordless appliance that includes a power source 12, typically a battery, that can be removed from the appliance 10. This power source 12 can be placed within the appliance 10 in an installed position 14 to provide electrical current to an operable portion 16 of the appliance 10. This power source 12 can also be removed from the appliance 10 and placed within a separate charger for recharging the power source 12 for later use within any one of several appliances 10. Typically, the appliances 10 include a suite of appliances 10 where various power sources 12 can be used interchangeably among the suite of appliances 10.

According to various aspects of the device, as exemplified in FIGS. 1-4, the appliance 10 includes a housing 30 that includes the operable portion 16. As discussed herein, the operable portion 16 can be in the form of a motor 32 that operates a rotary interface 34. This rotary interface 34 can be in the form of a blender, mixer, chopper, or other food processing portion of an appliance 10. The appliance 10 also includes a power receptacle 36 that is in electrical communication with the operable portion 16. The power receptacle 36 includes a high-friction interface 38 that is used to assist in securing a power source 12 in the installed position 14. The power source 12 is selectively engaged with the power receptacle 36 as well as the high-friction interface 38 to define the installed position 14. This installed position 14 places the power source 12 in engagement with a contact of the power receptacle 36 for delivering electrical current from the power source 12 to the motor 32 of the operable portion 16. At least one of the power source 12 and the power receptacle 36 can include a force reduction feature 40 that selectively operates to overcome the high-friction interface 38 to assist in removing the power source 12 from the installed position 14 and the power receptacle 36. As is discussed herein, this force reduction feature 40 can be in the form of various resilient members 42, a lever 44, combinations thereof, and other similar force reduction features 40 that can be attached to the housing 30 or the power source 12.

During use of the appliance 10, the motor 32 for the operable portion 16 can generate various vibrations within the appliance 10. These vibrations, in certain instances, can be sufficient to cause a "contact bounce" where the power source 12 temporarily disengages from the contact within the power receptacle 36. This temporary disengagement can result in a loss of electrical power within the appliance 10. The high-friction interface 38 is utilized for counteracting and resisting these vibration forces and maintaining the power source 12 within the installed position 14. Use of this high-friction interface 38, while securing the power source 12 in the installed position 14, can also produce difficulties in separating the power source 12 from the power receptacle 36. The use of the force reduction feature 40 resists vibration and provides a counteracting force that biases the power source 12 away from the installed position 14 and assists the user in separating the power source 12 from the power receptacle 36.

The high-friction interface 38 can be formed through the engagement of various mating electrical terminals 60 that are defined within each of the power source 12 and the power receptacle 36. The cooperative engagement of the electrical terminals 60 form a close engagement that is used to secure the power source 12 in the installed position 14. Due to this close engagement, separating the power source 12 from the installed position 14 can require a significant force to overcome the high-friction interface 38. The various force reduction features 40 described herein are utilized for disengaging the electrical terminals 60 that form the high-friction interface 38. Accordingly, the force reduction features 40 are configured to provide for a relatively limited amount of travel of the power source 12 with respect to the power receptacle 36. This amount of travel substantially corresponds to the distance necessary to disengage the electrical terminals 60. Once the electrical terminals 60 are disengaged, the power source 12 can be removed from the remainder of the power receptacle 36 with significantly less effort. Accordingly, as the power source 12 is removed from the power receptacle 36, the high-friction interface 38 is typically utilized near the installed position 14 and areas of the power receptacle 36 immediately adjacent to the installed position 14.

Referring again to FIGS. 2-4, the electrical terminals 60 that define the high-friction interface 38 can include any one of various engagement structures, such as electrical engaging features. These electrical terminals 60 can include one or more pins 62, and typically a set of pins 62 that selectively and matingly engage a respective and opposing set of electrical contacts 64 that are disposed on the power source 12 and the power receptacle 36. The location of the pins 62 and the electrical contacts 64 can vary with respect to the power source 12 and the power receptacle 36. As discussed herein the pins 62 and electrical contacts 64 selectively and matingly engage with one another to define an electrical engagement that selectively delivers the electrical current from the power source 12 to the motor 32 of the appliance 10.

Figure 2:
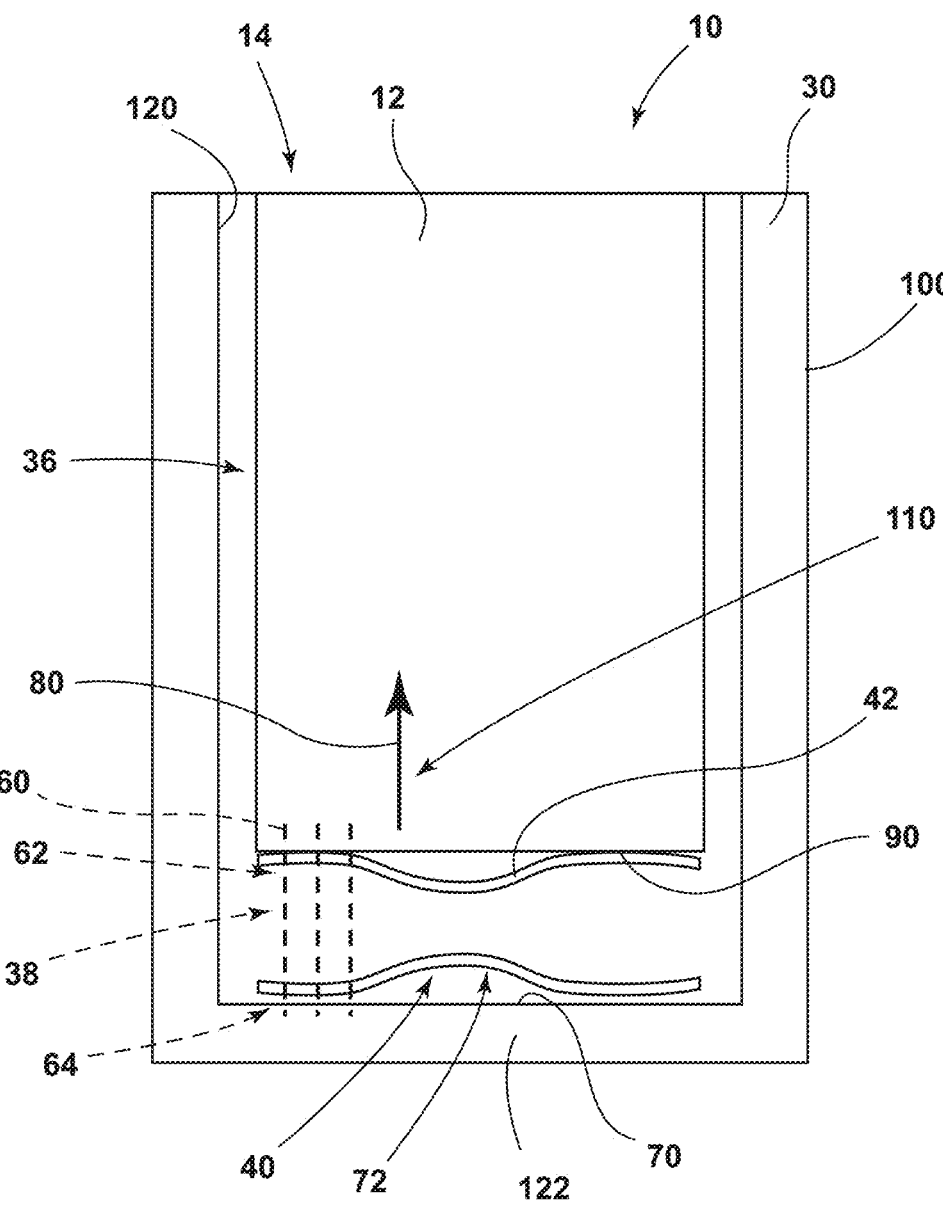
FIG. 2 is a schematic cross-sectional view of a power source installed within a power receptacle and showing a force reduction feature in the form of at least one interior spring.

Referring now to FIG. 2, the force reduction feature 40 can be in the form of a resilient member 42 that is positioned between the power source 12 and a surface 70 of the power receptacle 36. When the power source 12 is moved into the installed position 14, the resilient member 42 is preloaded within the power receptacle 36. As the power source 12 is installed within the power receptacle 36, a tab, latch, or other securing member maintains the power source 12 within the installed position 14 of the power receptacle 36 and also maintains the resilient member 42 in the pre-loaded state 72.

As exemplified in FIG. 2, the resilient member 42 can be in the form of a flat spring, leaf spring, or other similar resilient member 42. When in the pre-loaded state 72, the resilient member 42 exerts the biasing force 80 away from the installed position 14 and in an outward direction 110. Accordingly, when the securing mechanism of the power source 12 is disengaged, the resilient member 42 at least partially overcomes the high-friction interface 38 and assists the user in separating the power source 12 from the installed position 14 within the power receptacle 36.

Referring again to FIG. 2, the resilient member 42 can be attached to an underside 90 of the power source 12. In addition, the resilient member 42 can be attached to a surface 70 of the power receptacle 36 that receives the power source 12. The resilient member 42 is positioned to exert the biasing force 80 in the same outward direction 110 that the power source 12 can be extracted from the power receptacle 36. It is also contemplated that each of the power source 12 and the power receptacle 36 can include a cooperative component of the resilient member 42. In this manner, the resilient member 42 can include dedicated and respective resilient members 42 on each of the power source 12 and the power receptacle 36 that engage with one another to provide a cooperative biasing force 80 for absorbing vibration and assisting in separating the power source 12 from the power receptacle 36. Where each of the power source 12 and the power receptacle 36 include a component of the resilient member 42, the component of the resilient member 42 on the power source 12 can exert a portion of the biasing force 80 on the power receptacle 36. Similarly, the component of the resilient member 42 on the power receptacle 36 can exert a portion of the biasing force 80 on the power source 12.

The resilient member 42 can be in the form of one or more pieces of spring metal, one or more elastomeric members, combinations thereof, or other similar member that deflect to a pre-loaded state 72 when the power source 12 is disposed within the installed position 14 inside the power receptacle 36. As discussed herein, the resilient member 42 tends toward its original shape. In doing so, the resilient member 42 exerts the biasing force 80 that biases the power source 12 away from the installed position 14 and in the outward direction 110 from the power receptacle 36.

Figure 3:
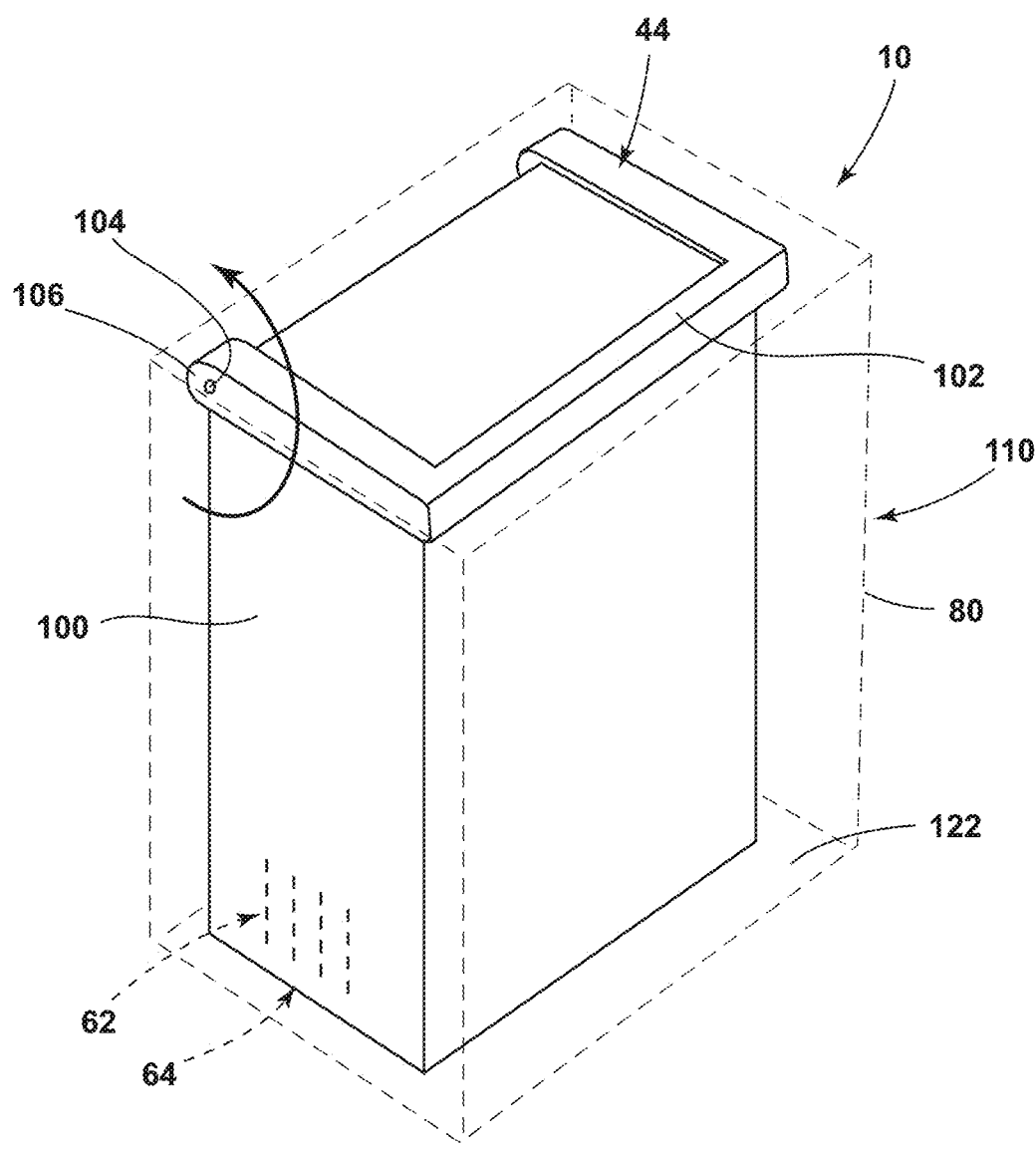
FIG. 3 is a schematic perspective view of a handle that is incorporated within the power source, where the handle generates a biasing force for extracting the power source from the power receptacle.
Figure 4:
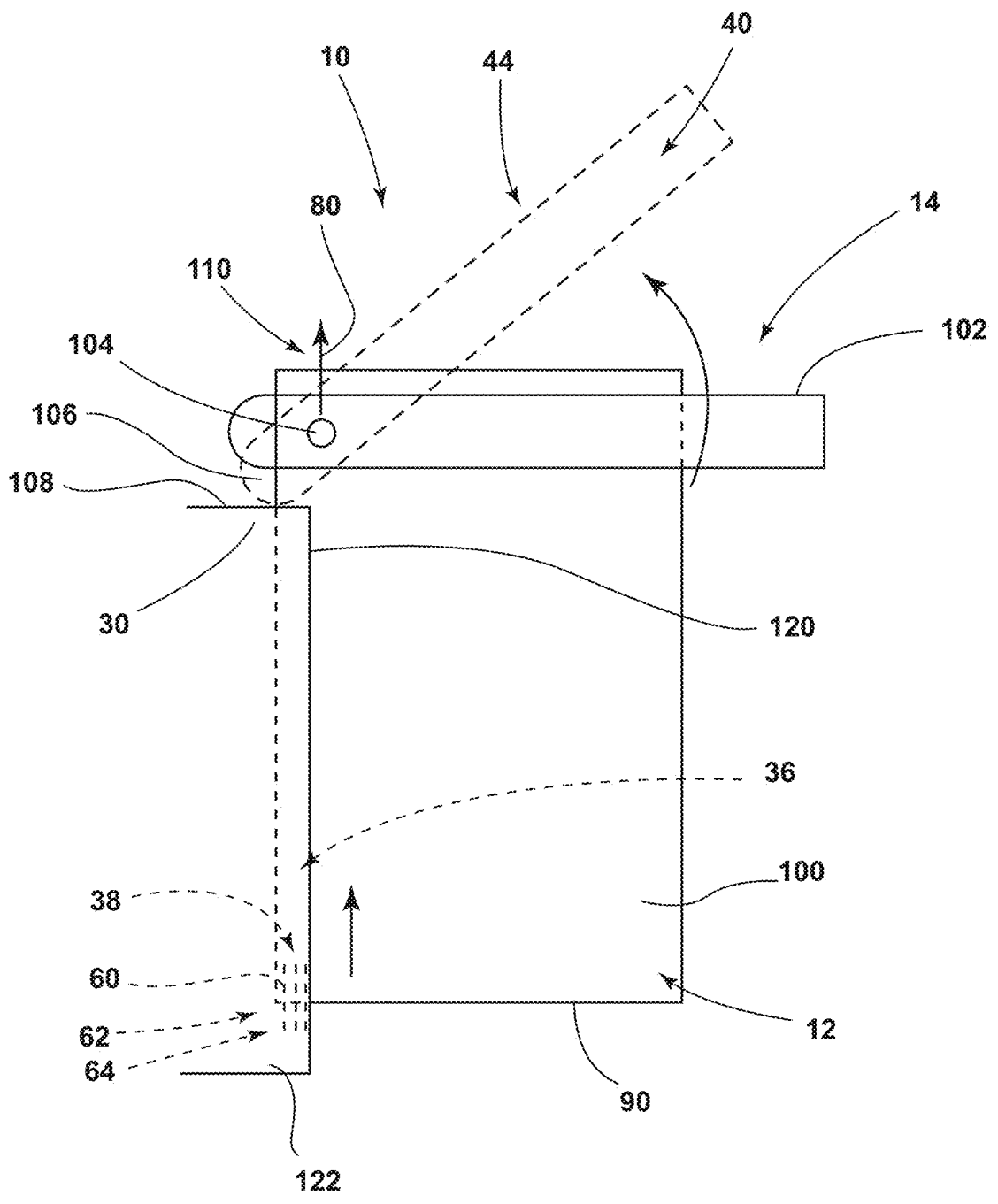
FIG. 4 is a schematic elevation view showing rotation of the handle that biases against a bearing surface for at least partially extracting the power source from the power recep-tacle.

According to various aspects of the device, as exemplified in FIGS. 3 and 4, the power source 12 (or the housing 30) can include a lever 44 that is rotationally operable. In certain aspects of the device, rotation of the lever 44, being coupled with the power source, can serve to extract the power source 12 from the power receptacle 36.

As exemplified in FIGS. 3 and 4, the lever 44 can be attached to the power source 12, such as an outer case 100 of the power source 12. In this manner, the lever 44 can include a handle 102, a fulcrum 104 and a biasing portion 106. During operation of the lever 44, the user can operate the handle 102 about the fulcrum 104 such that the biasing portion 106 engages a bearing surface 108. Engagement of the biasing portion 106 with the bearing surface 108 allows the user to exert the biasing force 80 against the bearing surface 108 such that the fulcrum 104 is moved in an outward direction 110 with respect to the high-friction interface 38 of the power receptacle 36. In certain aspects of the device, the lever 44 can cooperate with the resilient member 42 or the resilient members 42. In this manner, the lever 44 can operate to selectively increase the biasing force 80 acting on the power source 12 by cooperating with the various resilient members 42. The one or more resilient members 42 continually exert the biasing force 80 on the power source 12 when the power source 12 is in the installed position 14. Operation of the lever 44 selectively and temporarily increases the biasing force 80 that acts upon the power source to bias the power source 12 away from the installed position 14 and assist in the extraction of the power source 12 from the power receptacle 36.

The lever 44, being attached to an outer case 100 of the power source 12, generates the biasing force 80 that serves to overcome the high-friction interface 38 and extract the power source 12 from the power receptacle 36. As exemplified in FIG. 4, the handle 102 is configured to rotationally operate through a large rotational distance. This provides for a mechanical advantage the results in the biasing portion 106 exerting the biasing force 80 through the smaller path of travel. As discussed herein, the distance required to disengage the power source 12 from the high-friction interface 38 is relatively small.

Typically, the bearing surface 108 will be defined by a portion of the housing 30 for the appliance 10. In this manner, as the user operates the handle 102 of the lever 44, the biasing portion 106 of the lever 44 pushes against the housing 30 and generates the biasing force 80 away from the housing 30 to extract the power source 12 from the power receptacle 36. Use of the lever 44, according to various aspects, operate to convert a rotational motion of the lever 44 into an axial or linear motion of the biasing force 80. Accordingly, the rotational operation of the lever 44 can be transmitted through various linkages and to the bearing surface 108 of the housing 30. It is contemplated that the bearing surface 108 of the housing 30 can be located near the aperture 120 of the power receptacle 36 or near the base 122 of the power receptacle 36. Depending on the intended location of the bearing surface 108, one or more linkages can be included in the force reduction feature 40 to overcome the high-friction interface 38 and remove the power source 12 from the installed position 14. As discussed herein, the biasing force 80 operates to move the power source 12 typically only through the limited travel distance to disengage the electrical terminals 60 and the high-friction interface 38.

In certain aspects of the device, the handle 102 can also be attached to the housing 30. In such an aspect of the device, the biasing portion 106 of the lever 44 rotates to engage a portion of the outer case 100 of the power source 12. As the handle 102 of the lever 44 rotates about the fulcrum 104, the biasing portion 106 pries the power source 12 away from the installed position 14 to overcome the high-friction interface 38 of the power receptacle 36. In this aspect of the device, the outer case 100 of the power source 12 can include various notches and other features that can be used to allow the biasing portion 106 of the lever 44 to engage with the power source 12 to exert the biasing force 80 that can be used to extract the power source 12 from the installed position 14 and away from the power receptacle 36.

According to various aspects of the device, the various force reduction features 40 described herein can be utilized within any one of various cordless appliances 10. Such appliances 10 can be in the form of countertop appliances, portable appliances, handheld appliances, and other similar appliances that can be utilized in a cordless and battery-operated configuration.

The invention disclosed herein is further summarized in the following paragraphs and is further characterized by combinations of any and all of the various aspects described therein.

According to one aspect of the present disclosure, an appliance includes a housing that has an operable portion. A power receptacle is in electrical communication with the operable portion and has a high-friction interface. A power source selectively engages with the power receptacle to define an installed position that selectively delivers an electrical current from the power source to a motor of the operable portion. At least one resilient member exerts a biasing force against the power source when the power source is in the installed position. The high-friction interface maintains the power source in the installed position during operation of the motor and resists vibration from the operable portion to maintain the power source in the installed position, and at least one of the power receptacle and the power source include the at least one resilient member.

According to another aspect, each of the power source and the power receptacle includes a component of the at least one resilient member.

According to another aspect, each of the power source and the power receptacle includes a respective resilient member of the at least one resilient member.

According to another aspect, the power source includes a lever that selectively engages the housing when the power source is in the installed position. The lever is selectively operable to selectively increase the biasing force to bias the power source away from the installed position.

According to another aspect, the lever and the at least one resilient member cooperate to overcome the high-friction interface.

According to another aspect, the lever is rotationally operable to engage a bearing surface of the housing. Engagement of the lever and the bearing surface defines a portion of the biasing force.

According to another aspect, the high-friction interface is defined by electrical terminals that include a set of pins and an opposing set of electrical contacts that are disposed on the power source and the power receptacle.

According to another aspect, the set of pins and the opposing set of electrical contacts matingly engage with one another to define an electrical engagement that selectively delivers the electrical current from the power source to the motor.

According to another aspect, the lever includes a handle portion that is operable to extract the power source from the power receptacle.

According to another aspect, the lever includes a fulcrum that is rotationally attached to the power source.

According to another aspect, the fulcrum is positioned between the handle portion and a biasing portion that selectively engages the housing.

According to another aspect of the present disclosure, an appliance includes a housing that has an operable portion. A power receptacle is in electrical communication with the operable portion and has a high-friction interface. A power source selectively engages with the power receptacle and the high-friction interface to define an installed position that selectively delivers an electrical current from the power source to a motor of the operable portion. A lever is attached to the power source, and selectively engages a bearing surface of the housing in the installed position. The high-friction interface maintains the power source in the installed position during operation of the motor and resists vibrations from the operable portion to maintain the power source in the installed position, and the lever selectively operates to remove the power source from the installed position. A handle portion rotationally operates to exert a biasing force against the bearing surface that overcomes the high-friction interface and biases the power source away from the installed position.

According to another aspect, at least one of the power source and the power receptacle include a resilient member that partially absorbs the vibrations from the operable portion.

According to yet another aspect of the present disclosure, an appliance includes a housing that has an operable portion. A power receptacle is in electrical communication with the operable portion and has a high-friction interface. A power source selectively engages with the power receptacle to define an installed position that selectively delivers an electrical current from the power source to the operable portion. A resilient member exerts a biasing force against the power source when the power source is in the installed position. A lever is coupled to the power source. The lever is selectively operable to cooperate with the resilient member to increase the biasing force that selectively overcomes the high-friction interface. The high-friction interface maintains the power source in the installed position during operation of a motor of the operable portion and resists vibrations from the operable portion to maintain the power source in the installed position, and at least one of the power receptacle and the power source includes the at least one resilient member.

According to another aspect, each of the power source and the power receptacle includes a component of the at least one resilient member.

According to another aspect, each of the power source and the power receptacle includes a respective resilient member of the at least one resilient member.

According to another aspect, the lever is rotationally operable to engage a bearing surface of the housing. Engagement of the lever and the bearing surface defines a portion of the biasing force.

According to another aspect, the high-friction interface includes a set of pins and an opposing set of electrical contacts that are disposed on the power source and the power receptacle.

According to another aspect, the set of pins and the opposing set of electrical contacts matingly engage to define an electrical engagement that selectively delivers the electrical current from the power source to the motor.

According to another aspect, the lever includes a handle portion that is operable to extract the power source from the power receptacle. The lever includes a fulcrum that is rotationally attached to the power source, and the fulcrum is positioned between the handle portion and a biasing portion that selectively engages the housing.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

What is claimed is:

1. An appliance comprising:
a housing having an operable portion;
a power receptacle in electrical communication with the operable portion and having a high-friction interface;
a power source that is selectively engaged with the power receptacle to define an installed position that selectively delivers an electrical current from the power source to a motor of the operable portion; and
at least one resilient member that exerts a biasing force against the power source when the power source is in the installed position, wherein:
the high-friction interface maintains the power source in the installed position during operation of the motor and resists vibrations from the operable portion to maintain the power source in the installed position;
at least one of the power receptacle and the power source includes the at least one resilient member
the power source includes a lever that selectively engages the housing when the power source is in the installed position, the lever being selectively operable to selectively increase the biasing force to bias the power source away from the installed position; and
the lever includes a handle portion that is operable to extract the power source from the power receptacle, and further includes a fulcrum that is rotationally attached to the power source.

2. The appliance of claim 1, wherein each of the power source and the power receptacle includes a component of the at least one resilient member.

3. The appliance of claim 1, wherein each of the power source and the power receptacle includes a respective resilient member of the at least one resilient member.

4. The appliance of claim 1, wherein the lever and the at least one resilient member cooperate to overcome the high-friction interface.

5. The appliance of claim 4, wherein the lever is rotationally operable to engage a bearing surface of the housing, wherein engagement of the lever and the bearing surface defines a portion of the biasing force.

6. The appliance of claim 1, wherein the high-friction interface is defined by electrical terminals that include a set of pins and an opposing set of electrical contacts that are disposed on the power source and the power receptacle.

7. The appliance of claim 6, wherein the set of pins and the opposing set of electrical contacts matingly engage with one another to define an electrical engagement that selectively delivers the electrical current from the power source to the motor.

8. The appliance of claim 1, wherein the fulcrum is positioned between the handle portion and a biasing portion that selectively engages the housing.

9. An appliance comprising:
a housing having an operable portion;
a power receptacle in electrical communication with the operable portion and having a high-friction interface;
a power source that is selectively engaged with the power receptacle and the high-friction interface to define an installed position that selectively delivers an electrical current from the power source to a motor of the operable portion; and
a lever that is attached to the power source, wherein the lever selectively engages a bearing surface of the housing in the installed position, wherein:
the high-friction interface maintains the power source in the installed position during operation of the motor and resists vibrations from the operable portion to maintain the power source in the installed position; and
the lever selectively operates to remove the power source from the installed position, wherein a handle portion rotationally operates to exert a biasing force against the bearing surface that overcomes the high-friction interface and biases the power source away from the installed position.

10. The appliance of claim 9, wherein at least one of the power source and the power receptacle include a resilient member that partially absorbs the vibrations from the operable portion.

11. The appliance of claim 10, wherein the resilient member exerts the biasing force against the power source when the power source is in the installed position, wherein the resilient member and the lever cooperate to overcome the high-friction interface.

12. The appliance of claim 9, wherein the lever is rotationally operable to engage the bearing surface of the housing, wherein engagement of the lever and the bearing surface defines a portion of the biasing force.

13. The appliance of claim 9, wherein the high-friction interface is defined by electrical terminals that include a set of pins and an opposing set of electrical contacts that are disposed on the power source and the power receptacle.

14. The appliance of claim 13, wherein the set of pins and the opposing set of electrical contacts matingly engage with one another to define an electrical engagement that selectively delivers the electrical current from the power source to the motor.

15. An appliance comprising:
a housing having an operable portion;
a power receptacle in electrical communication with the operable portion and having a high-friction interface;
a power source that is selectively engaged with the power receptacle to define an installed position that selectively delivers an electrical current from the power source to the operable portion;
a resilient member that exerts a biasing force against the power source when the power source is in the installed position; and
a lever that is coupled to the power source, the lever being selectively operable to cooperate with the resilient member to increase the biasing force that selectively overcomes the high-friction interface, wherein:

the high-friction interface maintains the power source in the installed position during operation of a motor of the operable portion and resists vibrations from the operable portion to maintain the power source in the installed position;

at least one of the power receptacle and the power source includes the at least one resilient member; and the lever is rotationally operable to engage a bearing surface of the housing, wherein engagement of the lever and the bearing surface defines a portion of the biasing force.

16. The appliance of claim 15, wherein each of the power source and the power receptacle includes a component of the at least one resilient member.

17. The appliance of claim 16, wherein each of the power source and the power receptacle includes a respective resilient member of the at least one resilient member.

18. The appliance of claim 15, wherein the high-friction interface includes a set of pins and an opposing set of electrical contacts that are disposed on the power source and the power receptacle.

19. The appliance of claim 18, wherein the set of pins and the opposing set of electrical contacts matingly engage to define an electrical engagement that selectively delivers the electrical current from the power source to the motor.

20. The appliance of claim 19, wherein the lever includes a handle portion that is operable to extract the power source from the power receptacle, wherein the lever includes a fulcrum that is rotationally attached to the power source, and wherein the fulcrum is positioned between the handle portion and a biasing portion that selectively engages the housing.

* * * * *